H. L. TRIPLETT.
AUTOMATIC ROAD MAP FOR AUTOMOBILES.
APPLICATION FILED JUNE 20, 1911.
1,039,848.
Patented Oct. 1, 1912.
2 SHEETS—SHEET 1.
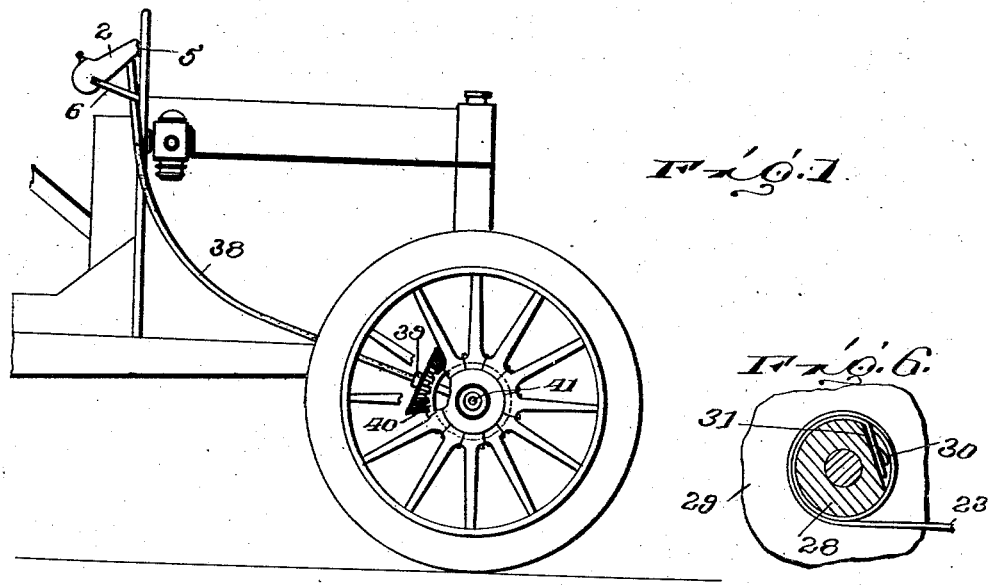
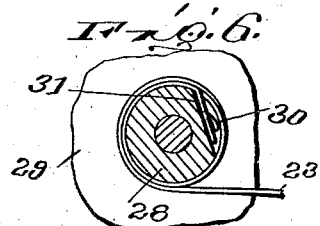
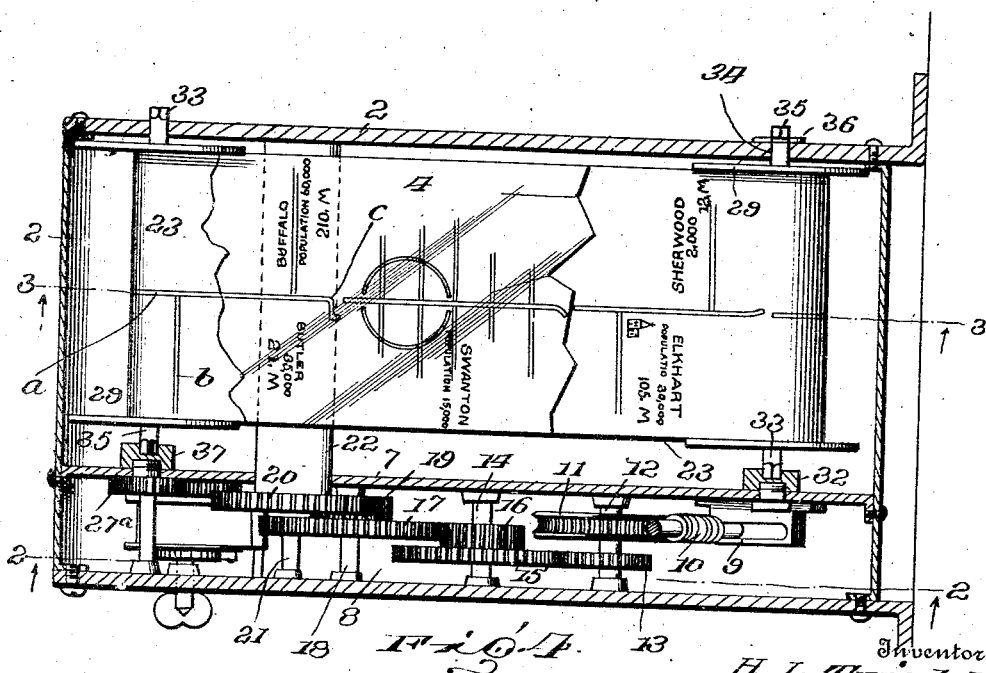
Witnesses
Inventor
H. L. Triplett
By
Attorneys H. L. TRIPLETT.
AUTOMATIC ROAD MAP FOR AUTOMOBILES.
APPLICATION FILED JUNE 20, 1911.
1,039,848.
Patented Oct. 1, 1912.
2 SHEETS—SHEET 2.
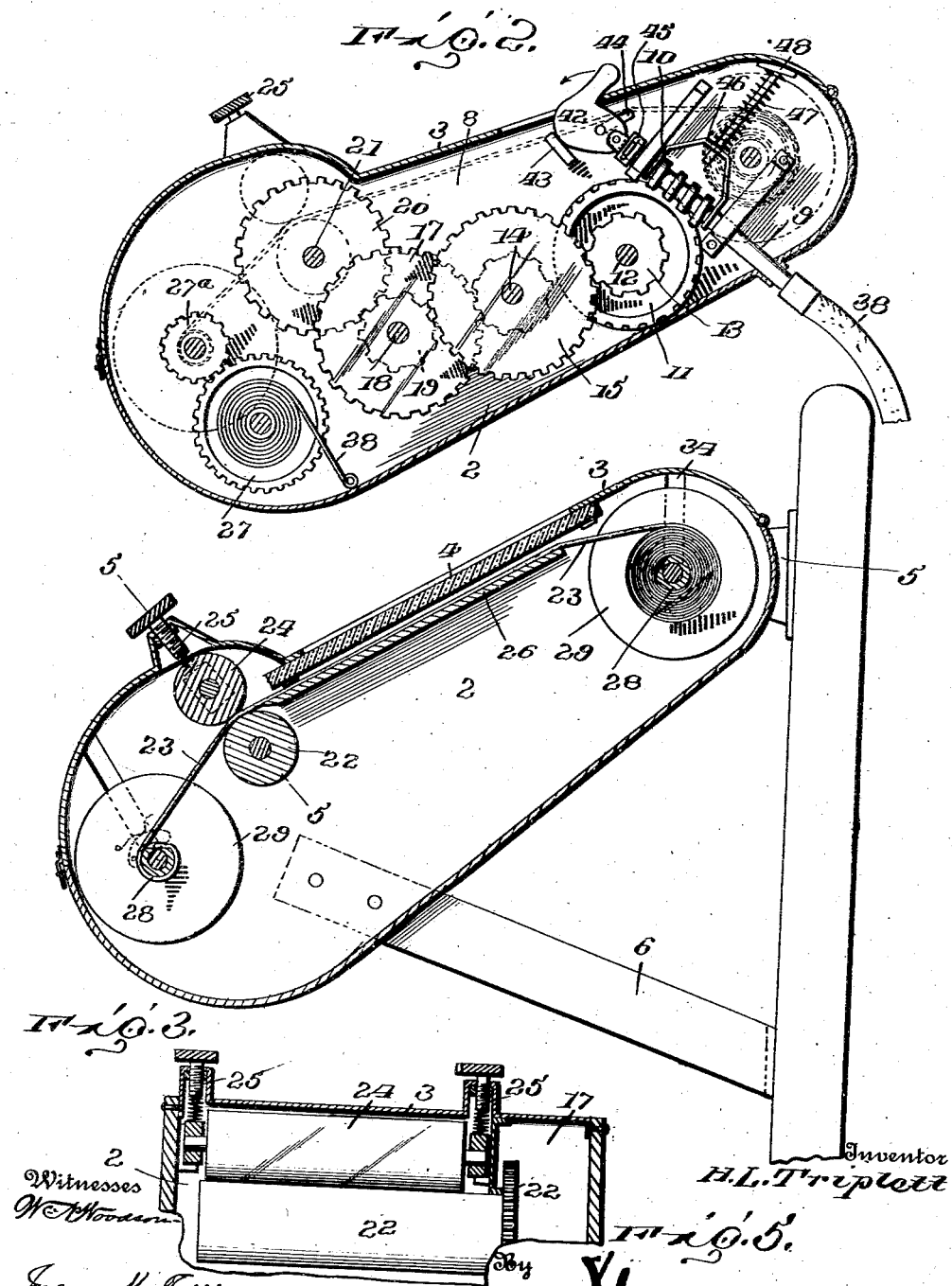

UNITED STATES PATENT OFFICE.

HUGH L. TRIPLETT, OF FORT WAYNE, INDIANA.

AUTOMATIC ROAD-MAP FOR AUTOMOBILES.

1,039,848.  Specification of Letters Patent.  Patented Oct. 1, 1912.

Application filed June 20, 1911. Serial No. 634,376.

*To all whom it may concern:*

Be it known that I, HUGH L. TRIPLETT, citizen of the United States, residing at Fort Wayne, in the county of Allen and State of Indiana, have invented certain new and useful Improvements in Automatic Road-Maps for Automobiles, of which the following is a specification.

My invention relates to maps and particularly to an automobile road map, the object of the invention being to provide a map mounted upon any convenient portion of an automobile and shifted by engagement with the driving wheels of the automobile so that the map will shift across the field of sight in time with the forward movement of the automobile.

Another object of the invention is the provision of a mechanism for supporting the map whereby the map may be reversely wound so that the same map may be used in going in either direction along the same road, by simply transposing the spool from which the map is unwound from one position to another.

A further object is to provide a system of gearing so arranged that the map will shift at a speed proportionate to but of course very much less than the speed of the automobile.

A further object is to provide means whereby the map rolling and unrolling mechanism may be disconnected from its driving mechanism so that the automobile may be operated without operating the map.

My invention is illustrated in the accompanying drawings wherein:

Figure 1 is a side elevation of the forward portion of an automobile showing my invention applied thereto. Fig. 2 is a section on the line 2—2 of Fig. 4. Fig. 3 is a section on the line 3—3 of Fig. 4. Fig. 4 is a plan view partly sectional of my attachment. Fig. 5 is a section on the line 5—5 of Fig. 3. Fig. 6 is an enlarged cross section of one of the spools on which the map is wound showing the means for attaching the map to the spool.

Corresponding and like parts are referred to in the following description and indicated in all the views of the accompanying drawings by the same reference characters.

The map actuating mechanism of my invention is contained within a case 2 shown as rectangular and as having a cover 3 with a glass panel 4 therein whereby the map may be observed. The front end of the case is formed with lugs 5, brackets or other supporting members whereby the case may be attached to the dashboard of an automobile, as illustrated in Fig. 1. The case is downwardly and rearwardly inclined so that the face of the case may be in convenient position to be observed by the driver of the machine, and the case may be additionally supported by means of a bracket 6, also attached to the dashboard of the machine. I of course do not wish to limit myself to any specific construction for this case.

Supported within the case is a spool upon which is initially wound the map. Supported at the lower end of the case and opposite to the spool is a winding spool or roller upon which the map is wound. The map is passed over a driving roller which is driven by a train of gear wheels from driving mechanism connected to one of the driving axles of the machine.

By reference to Fig. 4 it will be seen that the case 2 is divided into two parts by means of an interior longitudinally extending partition 7. The compartment 8 formed by the exterior wall of the case and the partition 7 constitutes a gear case in which are located the gears for driving the map engaging roller. Passing up through the bottom of the case and into the compartment 8 near the upper end of the machine is a worm shaft 9 formed with a worm 10 engaging teeth on the circumference of a gear wheel 11. This gear wheel is relatively large and preferably has twenty-four teeth. Mounted upon the shaft 12 of this gear wheel is a gear wheel 13 which is relatively small, preferably about half the size of the gear wheel 11 and is preferably provided with ten teeth. Mounted upon a shaft 14 is a gear wheel 15 of thirty teeth and slightly larger therefore than the gear wheel 11 which intermeshes with the gear wheel 13 and is driven therefrom, and also mounted upon the shaft 14 is a gear wheel 16 which has ten teeth and intermeshes with a relatively large gear wheel 17 mounted upon a shaft 18. This shaft carries upon it a relatively small gear wheel 19 having ten teeth which meshes with a relatively large gear wheel 20 having preferably twenty-six teeth and which is mounted upon a shaft 21 disposed above and slightly in advance of the shaft 18.

Mounted upon the shaft 21 is a rubber roller 22 which extends entirely across the main compartment of the case 2 and over which the map 23 travels. Supported upon the case above the roller 22 is a small rubber roller 24 which is spring pressed against the face of the map 23 as it passes over the roller 22, the spring being tensioned by means of the thumb screws 25. This roller 24 may be supported in any suitable manner upon the case 2.

The map 23 is initially wound upon a spool detachably supported at the upper end of the case, and from thence passed over a supporting plate 26 and over the roller 22 by which it is driven. It is wound up upon a receiving spool, which in turn is driven by a spring actuated gear wheel 27. The spring 28 actuating this gear wheel will tend to keep the receiving spool wound up so as to prevent any slack in the map between the driving roller 22 and the receiving spool.

It is intended that the spool upon which the map is initially wound shall be initially engaged with the upper end of the case above the plate 26, that the map shall be drawn over this plate, passed over the roller 22 and then engaged with the receiving spool, and that after the map has been entirely wound off from the delivery spool and wound up upon the receiving spool, the spool containing the map may be shifted to the upper end of the case and the former delivery spool shaft shifted to the lower end of the case and form a receiving spool so that the map may be run reversely to its original direction of travel with relation to the country delineated on the map. I do not wish to limit myself to any particular manner of attaching the map to the spools. Preferably I show each spool as formed with a central body 28 and end flanges 29, and provide the central body 28 with a hook-like finger 30 (see Fig. 6) which will engage with a loop 31 formed at each end of the map. Any other suitable means for engaging the spools with the map may be used, however. I do not wish either to be limited to any particular means for detachably supporting the delivery and receiving spools within the frame. I have shown for this purpose, however, the partition 7 as being provided with a rotatable member 32 having therein a socket in which the gudgeon 33 of the spool engages. The opposite side wall of the casing is slotted as at 34 so that the gudgeon 35 of the spool may be inserted in this slot. A latch 36 is pivoted to the side of the casing so as to be turned down over the gudgeon. This latch is held in place by means of a spring or other suitable devices and may be turned up to permit the removal of the spool.

At the lower end of the frame the wall 7 is provided with a rotatable member 37 which is precisely the same as the member 32 and like it is provided with a square socket. The gudgeons 33 and 35 of each spool are provided at each end with a squared head which will engage in this square socket. The member 37 is driven by engagement with the spring actuated gear wheel 27, by means of pinion 27ª.

It will be obvious that one rotation of the worm shaft 9 will cause the gear wheel 11 to move one tooth, and this will transmit a much reduced motion to the shaft 14, and this motion in turn will be transmitted to the gear wheel 19 and from this gear wheel to the gear wheel 20 and that thus a very slight motion will be communicated to the rubber roller 22 over which the map 23 passes. By properly proportioning these gears 11, 13, 15, 16, 17, 19 and 22, it is possible to secure any desired rate of travel for the map. Preferably, however, the gears will be so proportioned that the map will travel about two inches for every mile of road covered by the automobile in its travel.

I do not wish to limit myself to any particular means for driving the train of gears which actuate the map, but I have preferably used for this purpose a flexible shaft 38 which at one end is connected to the worm shaft 9 and at its other end carries a bevel gear wheel 39 which engages with a bevel gear wheel 40 on the traction wheel shaft 41. Preferably the wheel 40 is a wheel of thirty-six teeth, and the wheel 39 is also provided with thirty-six teeth. A thirty-six inch wheel is preferably provided with a gear 40 provided with thirty-six teeth, but for different sizes of wheels the gear 40 must be changed. Preferably the gear 40 on the wheel which drives the shaft 38 should be formed with the same number of teeth as the wheel is inches in diameter, but the gear 39 on the shaft 38 should have only thirty-six teeth. Thus if the driving wheel is thirty-eight inches in diameter, the gear wheel 40 should have thirty-eight teeth, and this engaging with the gear 39 having thirty-six teeth will drive it 38/36 as fast as a thirty-six inch wheel, for the reason that a thirty-eight inch wheel makes fewer revolutions to a mile than a thirty-six inch wheel.

In order to disconnect the shaft 9 from the gear 11, I provide a lever 42 which is angular in shape and which has a rounded face engaging with an abutment 43 within the gear case. The lever 42 has a pin which operates in the slot 44, and the inner angular end of the lever is pivoted to a swivel 45 within which the extremity of the shaft 9 is received. The worm on the shaft 9 is held in engagement with the gear 11 by means of a yoke 46 which is guided by or carried upon a pin 47 loosely connected at its outer end to the gear case and surrounded by a coil spring 48. When the lever 42 is pulled over in the direction of the arrow (Fig. 2), the worm on the shaft 9 is thrown out of mesh with the gear 11. When the lever is turned to the position illustrated in Fig. 2, the spring 48 forces the shaft 9 into engagement with the gear wheel 11.

The map 23 consists of a narrow strip of paper, provided at its ends with loops whereby it may be attached to the spools. Extending longitudinally along the map is a line *a* indicating the line of travel to be taken by the automobile, as for instance a certain definite route from one city to an adjacent city. Extending laterally from this line are lines indicating intersecting or branching roads which are designated *b*. If the road itself turns, an indication of this turning movement is made by offsetting line *a* as at *c* either to the right or to the left, but the main line continues beyond this offset in practically a middle position with relation to the side edges of the strip 23. I have found by experience that it is amply sufficient to indicate a turning off to the automobilist without so forming the map as to show the exact form of this turn.

The map is preferably covered with a glass panel 4, and the glass panel is preferably provided with marks indicating the place on the road where the machine is supposed to be at any particular time. As illustrated in Fig. 4 the glass panel is provided with two semicircular marks which inclose that portion of the map indicating that particular part of the road on which the automobile is traveling.

While the map might be of any suitable length, and therefore might cover a very extended trip, I preferably form the map in relatively short sections covering a relatively short section of road. When one section has been wound up upon the receiving spool, the spool with a map of another section of road might be inserted in place, etc., until the tour was completed. Upon a return trip over the same roads, the spools are replaced but in reverse order so that the last spool used would be used first upon a return trip, and the map is run off reversely. It is thus adaptable for use in either direction upon a road. Furthermore, it will be possible to provide the strip 23 with maps upon both faces, thus making one strip do for two sections of road.

I do not wish to be limited to any of the details of my invention as it is obvious that many changes might be made without departing from the spirit of the invention as set forth in the appended claim.

What I claim is:

A map carrier for vehicles comprising a case, a longitudinal partition dividing the case into two compartments, rollers in one of said compartments, a web connected to said rollers to wind from one to the other, a train of gearing in the other compartment, connections whereby said gearing will actuate the web, a driving shaft entering the case adjacent one end gear of the train of gearing, a yoke slidably mounted in the case and carrying said shaft, a spring bearing on said yoke to press the same toward the gearing and hold the shaft normally in operative engagement with the gearing, a swivel on the end of the shaft, an abutment in the case adjacent the end of the shaft, and an angle lever having an arm projecting through the case, an arm pivoted to the swivel, a pin and slot connection with the case and a cam edge bearing against the abutment.

In testimony whereof, I affix my signature in presence of two witnesses.

HUGH L. TRIPLETT. [L. S.]

Witnesses:
C. V. KEYS,
ROY. STALDER.